Figure 1:
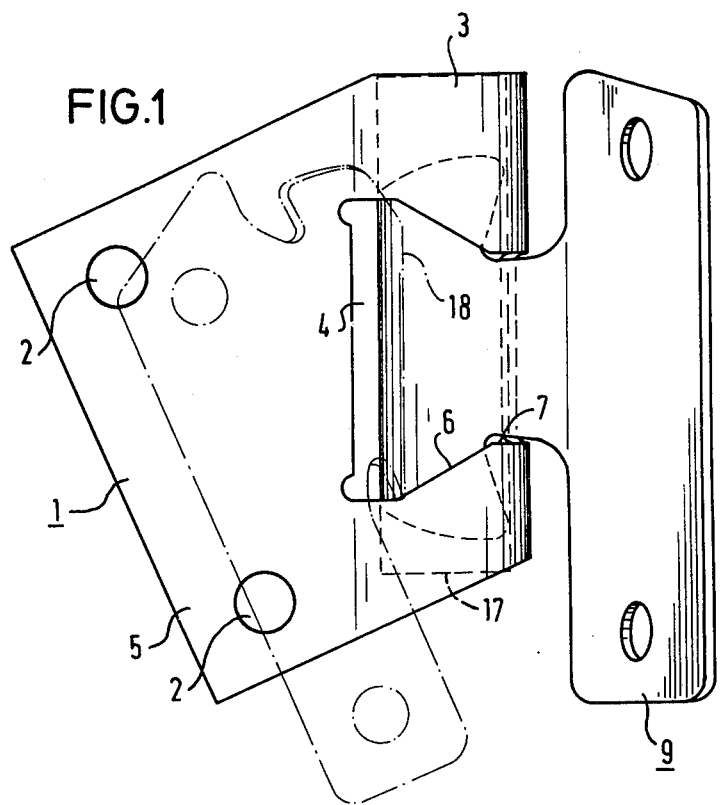

United States Patent [19]
Schmid

[11] 4,296,525
[45] Oct. 27, 1981

[54] SWIVEL FITTING FOR FITTING PARTS OF A SAFETY BELT

[75] Inventor: Johann Schmid, Schwäbisch-Gmünd, Fed. Rep. of Germany

[73] Assignee: REPA Feinstanzwerk GmbH, Alfdorf, Fed. Rep. of Germany

[21] Appl. No.: 121,473

[22] Filed: Feb. 14, 1980

[30] Foreign Application Priority Data

Feb. 15, 1979 [DE] Fed. Rep. of Germany ....... 2905863

[51] Int. Cl.³ .............................................. E05D 1/06
[52] U.S. Cl. ........................................ 16/174; 16/168
[58] Field of Search ................. 16/174, 176, 178, 172, 16/171, 175, 168, 169

[56] References Cited

U.S. PATENT DOCUMENTS 1,075,569 10/1913 Holtzhouser ........................... 16/174
2,683,892 7/1954 Gorman ................................. 16/176

FOREIGN PATENT DOCUMENTS 2406706 of 1975 Fed. Rep. of Germany.
450524 of 1949 Italy ....................................... 16/172

Primary Examiner—Andrew V. Kundrat
Attorney, Agent, or Firm—Herbert L. Lerner; Laurence A. Greenberg

[57] ABSTRACT

Swivel fitting for fitting parts of a safety belt which are connectible together in a swivel relationship, including a first fitting part having a fitting portion and a cylindrically-shaped bearing eye integral therewith, the bearing eye having a truncated cutout formed therein with the wide part thereof disposed adjacent to the fitting portion and the narrow part thereof forming a centering slot centrally disposed in the cylindrical bearing eye, a plastic cylinder having a slot formed therein and being inserted in the bearing eye, a second fitting part having a substantially T-shaped extension integral therewith with a center leg and two side legs, the T-shaped extension being radially insertable into the slot formed in the plastic cylinder through the wide part of the cutout formed in the bearing eye and the center leg thereof being swingable into the narrow part of the cutout formed in the bearing eye and form-lockable therein in the axial direction of the bearing eye in an operating position.

6 Claims, 5 Drawing Figures

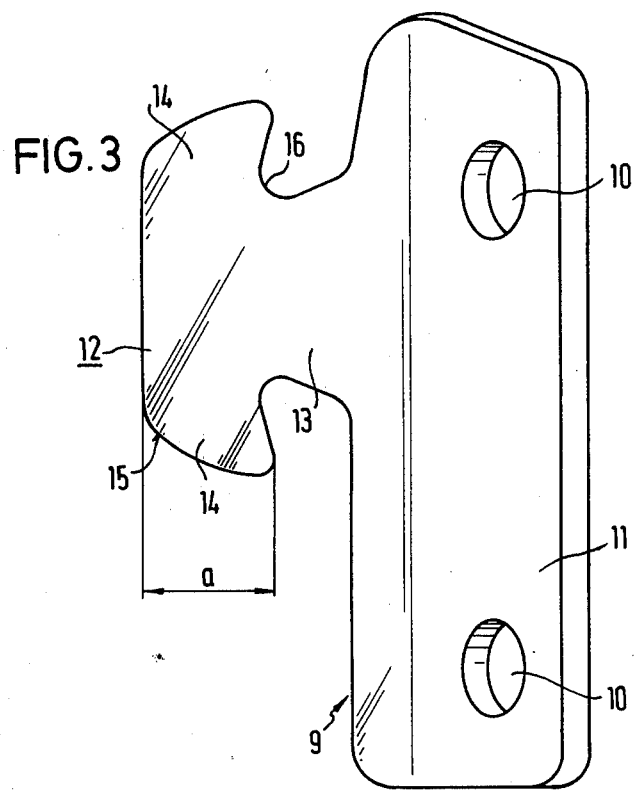
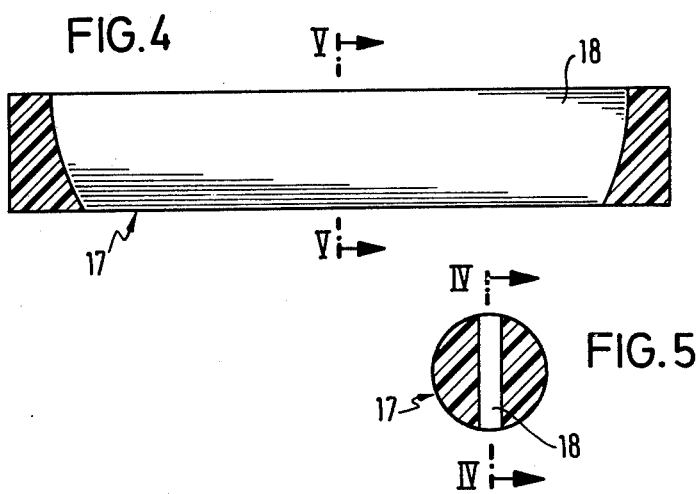

SWIVEL FITTING FOR FITTING PARTS OF A SAFETY BELT

The invention relates to a swivel fitting for two fitting parts of a safety belt, which are connected together in a swivel relationship, especially for fastening a belt lock to a vehicle body.

Swivel fittings are known, for instance, for door hinges, in which plastic is used as bearing material. Thus, in one known door hinge, for instance, the bearing parts formed in the shape of eyes or bushings of one fitting part are surrounded by a sheathing of plastic material. A metallic hinge pin is axially inserted into the support areas of these eyes that are formed of plastic or into bushing-shaped extensions, as well as into an extension likewise formed in the shape of a bushing, of another fitting part. Such a structure is shown in German Published Non-Prosecuted Application No. DE-OS 24 06 706. Because both fitting parts must be formed in bushing-fashion, the manufacture of such a swivel fitting is relatively expensive. If such a swivel fitting is used for safety belts, additional problems arise regarding the mechanical load carrying capacity of the bearing material, which is plastic.

It is accordingly an object of the invention to provide a swivel fitting for fitting parts of a safety belt which overcomes the hereinafore-mentioned disadvantage of the heretofore-known devices of this general type, and to do so in such a manner that it can be produced at a cost saving and has, on the one hand, with respect to the swivel properties, the advantages of a plastic bearing and which, on the other hand, avoids the disadvantages with respect to mechanical strength.

With the foregoing and other objects in view there is provided, in accordance with the invention, a swivel fitting for fitting parts of a safety belt which are connectible together in a swivel relationship especially for fastening the belt lock to the vehicle body, comprising a first fitting part having a fitting portion and a cylindrically-shaped bearing eye integral therewith, the bearing eye having a tapered truncated cutout formed therein with the wide part thereof disposed immediately adjacent to the fitting portion and the narrow part thereof forming a centering slot centrally disposed in the cylindrical bearing eye, a plastic cylinder having a slot formed therein and being inserted in the bearing eye, a second fitting part having a substantially T-shaped extension integral therewith with a center leg or middle arm and two side legs, the T-shaped extension being radially insertable into the slot formed in the plastic cylinder through the wide part of the cutout formed in the bearing eye and the center leg thereof being swingable into the narrow part of the cutout formed in the bearing eye in radial direction and form lockable therein in the axial direction of the bearing eye in an operating position.

In accordance with another feature of the invention, there are provided means for fastening the first fitting part to a safety belt lock and means for fastening the second fitting part to a vehicle body. The plastic cylinder serving as the swivel support can be made of two parts with semicircular cross-section, or as a one-part cylinder part with a radial slot formed therein. The manufacture of the swivel fitting according to the invention is simplified considerably by the fact that only the first fitting part needs to be provided with at least one bearing eye, while the second fitting part is constructed purely as a stamped part. The assembly of the two fitting parts is conceivably simple, inasmuch as the second fitting part is inserted outside of its operating position, through the cutout in the cylinder surface of the eye and into the slot of the plastic cylinder and therefore, into the vicinity of the bearing opening. The second fitting part is then brought, by rotating it into the operating position, into a position in which it is centered and locked relative to the first fitting part, and can take up any mechanical stress occurring in the event of a crash. The assembly of the two fitting parts, i.e., the swivel motion of the second fitting part from the assembly position into the operating position, is facilitated, by the fact that in accordance with an added feature of the invention, the truncated cutout formed in the bearing eye is funnel-shaped.

In accordance with an additional feature of the invention, the first and second fitting parts are formed from flat stock.

In accordance with yet another feature of the invention, there is provided a stop formed on the bearing eye forming an end of the narrow part of the cutout formed therein for limiting the swing of the center leg of the T-shaped extension.

An increase of the mechanical strength and load carrying capacity of the swivel fitting is obtained because, in accordance with a concomitant feature of the invention, the width of the cutout formed in the bearing eye is less than the overall combined width of the side legs of the T-shaped extension, the side legs each having an end integral with the center leg and a free end extending away from the center leg, the side legs being tightly fit, largely without play, into the bearing eye and having rounded corners at the free ends thereof and undercuts formed therein in vicinity of the center leg, whereby the side legs are swingable into the slot formed in the plastic cylinder from the side. In this manner, the width of the cutout in the cylindrical surface of the eye can be reduced and the cross section of the material taking up the tensile forces can thereby be increased.

Other features which are considered as characteristic for the invention are set forth in the appended claims.

Although the invention is illustrated and described herein as embodied in a swivel fitting for fitting parts of a safety belt, it is nevertheless not intended to be limited to the details shown, since various modifications and structural changes may be made therein without departing from the spirit of the invention and within the scope and range of equivalents of the claims.

Figure 2:
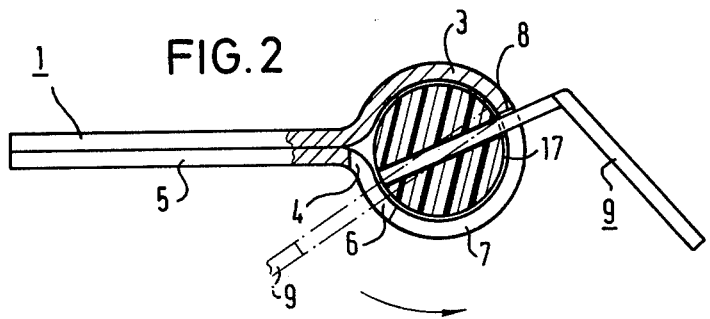

The construction and method of operation of the invention, however, together with additional objects and advantages thereof will be best understood from the following description of specific embodiments when read in connection with the accompanying drawings, in which:

FIGS. 1 and 2 are diagrammatic top plan and partly broken away side-cross-sectional views, respectively, of the swivel fitting according to the invention;

FIG. 3 is a detailed diagrammatic top plan view of the second fitting part of the swivel fitting according to the invention; and FIGS. 4 and 5 are two different diagrammatic cross-sectional views of the plastic cylinder used in the swivel fitting according to FIGS. 1 and 2, FIG. 4 being taken along the line IV—IV in FIG. 5 in the direction of the arrows and FIG. 5 being taken along the line V—V in FIG. 4 in the direction of the arrows.

Referring now to the figures of the drawing and first particularly to FIG. 1 thereof, there is seen a first fitting part formed of metallic flat stock which is designated with reference numeral 1. The first fitting part 1 is a stamped strip which is provided with mounting holes 2, is bent together, and is formed at one end thereof into a circular bearing eye 3. Into the cylindrical surface of the bearing eye 3, a substantially rectangular cutout 4 is formed in the immediate vicinity of the bearing eye 3 and its connection to a flat fitting portion 5 of the first fitting part 1. As is clearly shown in FIGS. 1 and 2, this cutout 4 leads through a funnel-shaped constriction 6 into a funnel-shaped central centering slot 7 which extends, as shown in FIG. 2, to beyond the radial center plane of the bearing eye 3 where it forms a stop, for the second fitting part 9, with its border edge 8.

The second fitting part 9, shown in detail in FIG. 3, is constructed purely as a stamped part having a fitting plate 11 provided with two mounting holes 10 and a T-shaped extension 12. The extension 12 has a center leg 13 and two legs 14 extending away from the center leg 13. The width a of the legs 14 corresponds to the inside diameter of the circular bearing opening of the bearing eye 3. The T-shaped extension 12 has rounded portions 15 as well as undercuts 16. In the embodiment example, the fitting plate 11 of the second fitting part 9 is bent at an angle relative to the extension 12, as shown in FIG. 2.

A plastic cylinder pin 17 having a circular cross section is shown in a cross-sectional view in FIGS. 4 and 5. The cylinder 17 has a radial slot 18 formed therein and the cylinder itself is pushed axially into the bearing opening of the bearing eye 3 of the fitting part 1.

In the embodiment example shown, the axial length of the cutout 4 is less than the overall length of the two legs 14 of the extension 12 of the second fitting part 9. As illustrated with the aid of FIGS. 1 and 2, the plastic cylinder 17 is brought into a position for assembling the fitting parts 1 and 9 such that its slot 18 is located in alignment with the height of the cutout 4 of the first fitting part 1. Then the second fitting part can be turned or swung, as indicated by dot-dash phantom lines in FIGS. 1 and 2, through the cutout 4 into the slot 18 of the plastic cylinder 17 about a pivot axis which is perpendicular to the bearing axis of the swivel fitting; this is possible because of the existence of the rounded corners 15 and the undercuts 16 formed on the extension 12. After the extension 12 is fully swung in, the second fitting part 9 can be swung in the direction of the arrow shown in FIG. 2 into the operating position. During this process the center leg 13 slides through the funnel-shaped constriction 6 into the centering slot 7, where it, and thereby the entire second fitting part 9, is guided axially in a form-locking manner relative to the first fitting part 1, which is a locking arrangement formed by the shape of the parts. If a load is placed on the safety belt, the belt lock of which is fastened to the fitting part 1 for instance, the legs 14 of the extension 12, which are supported in the bearing eye 3 in a form-locking manner, can fully take up the tensile forces. The second fitting part 9 is fastened by means of the mounting holes 10, for instance, to the vehicle body. The end of the centering slot 7 serves as a stop for the swivel motion of the second fitting part 9.

There is claimed:

1. Swivel fitting for fitting parts of a safety belt which are connectible together in a swivel relationship, comprising a first fitting part having a fitting portion and a cylindrically-shaped bearing eye integral therewith, said bearing eye having a cutout formed therein with converging edges about said cylindrically-shaped bearing eye forming a wide part thereof disposed adjacent to said fitting portion and a narrow part thereof forming a centering slot centrally disposed in said cylindrical bearing eye, a plastic cylinder pin having a slot formed therein and being inserted in said bearing eye, a second fitting part having a substantially T-shaped extension integral therewith with a center leg and two side legs, said T-shaped extension being radially insertable into said slot formed in said plastic cylinder pin through the wide part of said cutout formed in said bearing eye and said center leg thereof being swingable into the narrow part of said cutout formed in said bearing eye and lockable therein in the axial direction of said bearing eye in an operating position.

2. Swivel fitting according to claim 1, including means for fastening said first fitting part to a safety belt lock and means for fastening said second fitting part to a vehicle body.

3. Swivel fitting according to claim 1, wherein said cutout formed in said bearing eye is funnel-shaped.

4. Swivel fitting according to claim 1 or 3, wherein said first and second fitting parts are formed from flat stock.

5. Swivel fitting according to claim 1 or 3, including a stop formed on said bearing eye forming an end of the narrow part of said cutout formed therein for limiting the swing of said center leg of said T-shaped extension.

6. Swivel fitting according to claim 1, wherein the width of said cutout formed in said bearing eye is less than the overall combined width of said side legs of said T-shaped extension, said side legs each having an end integral with said center leg and a free end extending away from said center leg, said side legs being tightly fit into said bearing eye and having rounded corners at said free ends thereof and undercuts formed therein in vicinity of said center leg, whereby said side legs are swingable into said slot formed in said plastic cylinder pin from the side.

* * * * *